Nov. 15, 1960     H. E. W. WEST     2,959,918
INTERNAL COMBUSTION ENGINES

Filed April 21, 1955     3 Sheets-Sheet 1

INVENTOR
Harold Edward William West
BY Leech and Racine
ATTORNEYS

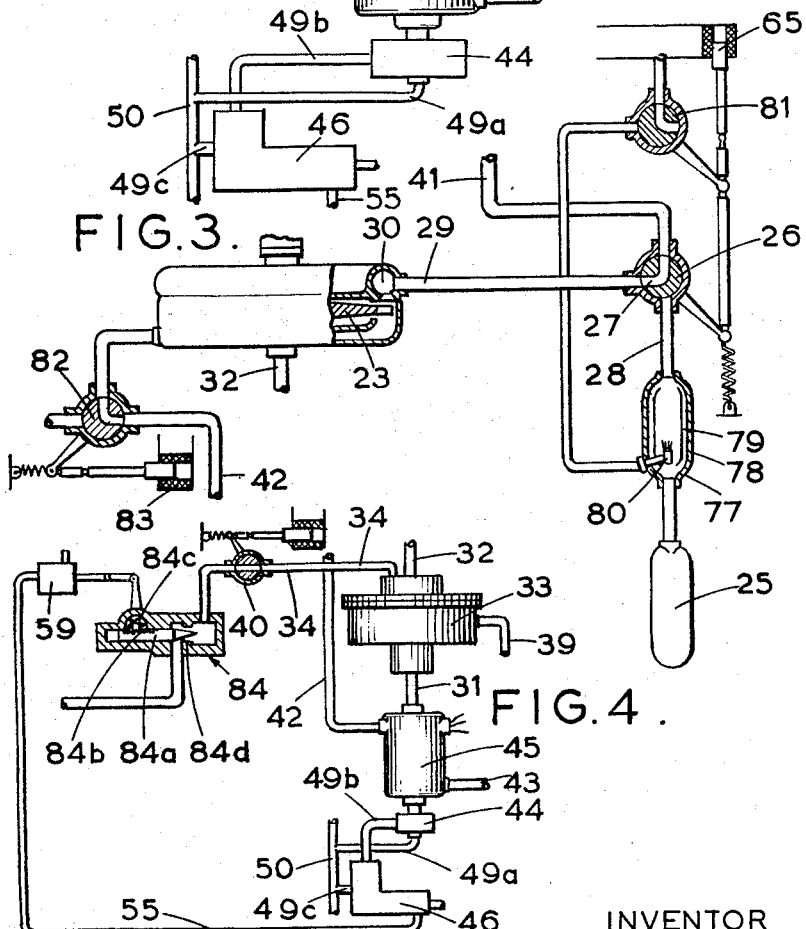

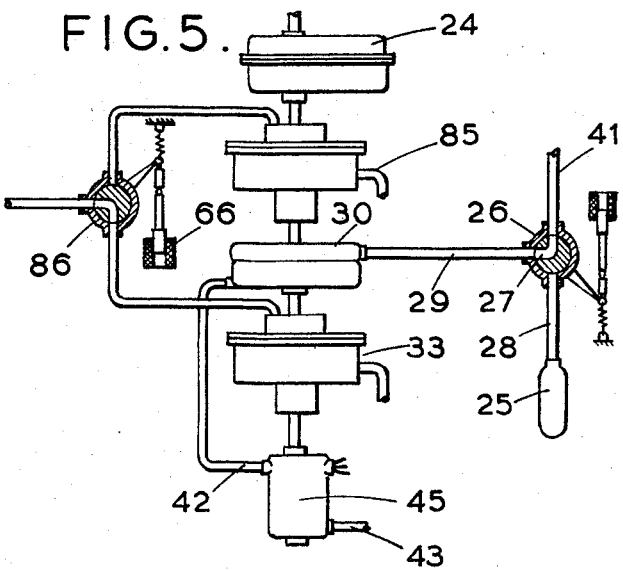
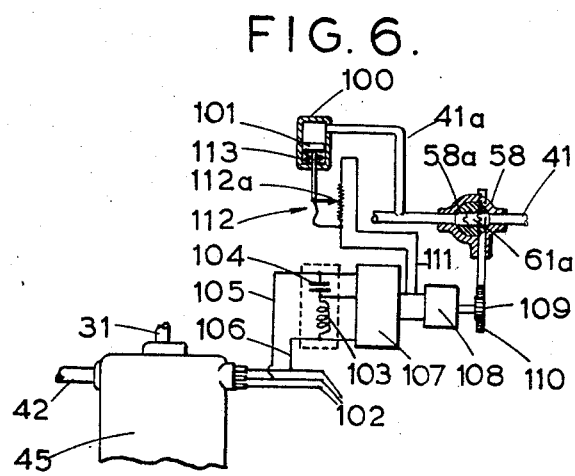

United States Patent Office 2,959,918
Patented Nov. 15, 1960

2,959,918
INTERNAL COMBUSTION ENGINES

Harold Edward William West, Allestree, England, assignor to Rolls-Royce Limited, Derby, England, a British company Filed Apr. 21, 1955, Ser. No. 503,184

Claims priority, application Great Britain Apr. 26, 1954

17 Claims. (Cl. 60—39.14)

This invention relates to internal combustion engines and has particular application to engines of the gas-turbine kind, for example those used for aircraft propulsion.

According to the present invention an internal combustion engine is provided with a turbine supplied with pressure gas which may be air and having a drive connection to the engine effective for rotating the engine in starting, and additionally having a drive connection to an electrical generator.

According to a feature of the invention in a power plant installation comprising one or more internal combustion engines at least one of said engines is provided with a turbine having a drive connection to the engine effective for rotating the engine in starting, and additionally having a drive connection to an electrical generator, said turbine being supplied with pressure gas from an external source (which may be another engine in the installation) during starting of the engine and deriving pressure gas thereafter from the engine or from another engine in the installation.

For convenience the turbine which drives the engine in starting and thereafter the generator is referred to as the starter-generator turbine.

Preferably the electrical generator is of the alternator kind and suitable means are provided for maintaining a desired frequency of output from the alternator. Such means might comprise a governor sensing the frequency of the alternator or driven in dependence on the alternator speed and arranged to vary the gas flow to the starter-generator turbine, or the slip in a coupling driving the same.

In certain cases it may be desirable to make the action of the governor dependent at least in part on a function related to the rotational speed of the internal combustion engine; for example in the case of a gas-turbine engine such function may be compressor delivery pressure.

The invention has particular application to internal combustion engines of the gas-turbine kind which normally comprise a compressor system delivering air to combustion equipment in which fuel is burnt, the products of combustion passing to a turbine system driving the compressor system. Such engines are normally started by rotating a compressor/turbine rotor system, when fuel is introduced into the combustion equipment and ignited, the speed of rotation of the compressor/turbine rotor system being increased by the external power source until such time as the engine becomes self-driving.

Thus in accordance with a feature of the invention a gas-turbine engine installation includes a gas-turbine engine provided with an air turbine having a drive connection to a compressor/turbine rotor system effective for rotating this system in starting of the engine, and additionally having a drive connection to an electrical generator, said air turbine being supplied from an external source or from another engine in the installation during starting of the engine and being supplied with air compressed from the compressor system of the engine and/or of another engine of the installation.

In arrangements according to the present invention provision will be made for rendering the drive between the starter generator-turbine and the engine ineffective when the engine has started, by the provision of a freewheel device and/or a clutch device. Preferably in addition means are provided for removing the load of the electrical generating means from the starter generator-turbine during starting of the engine. For example a clutch device may be provided between the starter generator-turbine and the electrical generating means, whereby the latter is physically disconnected from the turbine in starting of the engine. In certain cases, however, it may be satisfactory to disconnect the field winding of an electrical generator such as an alternator, whereby the electrical load is not imposed during starting of the engine.

According to a further feature of the invention exhaust gas from an air turbine is used for cooling the electrical generator, where the temperature of the exhaust gas is reduced by expansion in the air turbine to a value sufficiently low to be effective for said cooling purposes.

Examples of this invention are illustrated diagrammatically in the accompanying drawings.

Figure 2 shows an alternative arrangement of alternator drive to that illustrated in Figure 1.

Figure 3 shows the use of combustion equipment for initially driving the turbine.

Figure 4 shows a method of governing the alternator speed which is alternative to that illustrated in Figure 1.

Figure 5 shows an alternative method of changing over the drive of the turbine from the engine to the alternator, and Figure 6 shows an alternative governor arrangement in which the frequency of the alternator is sensed.

Figures 4 and 5 are on a reduced scale to Figures 1, 2, 3 and 6.

Figure 1:
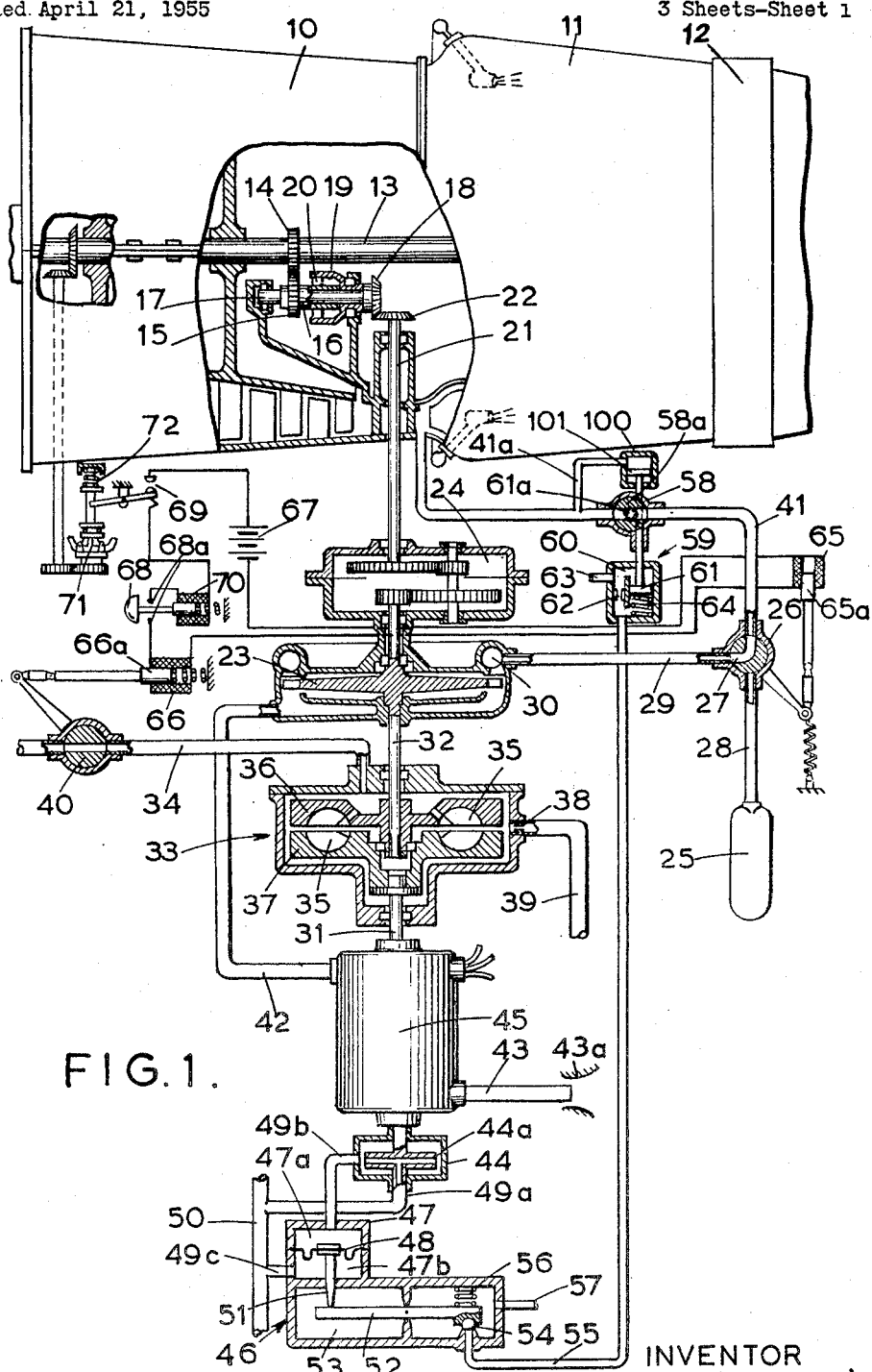
Figure 1 shows one preferred arrangement according to this invention.

Referring to Figure 1, a gas-turbine engine comprises a compressor system 10, combustion equipment 11 and turbine system 12. The turbine system drives the compressor system through shaft 13 supporting a gear element 14 meshing with spur gear 15. The latter is supported on a sleeve 16 which is rotatable on a shaft 17 to which is secured a bevel gear 18 and additionally the outer member 19 of a freewheel device of the jamming roller kind. The sleeve 16 constitutes the inner part of the freewheel device, rollers being indicated at 20. The arrangement is such that when the rotational speed of the sleeve 16 exceeds that of the shaft 17 the drive from the shaft 17 to the sleeve 16 becomes ineffective.

The shaft 17 is driven from shaft 21 by bevel gear 22 meshing with bevel gear 18, whilst the shaft 21 is driven from an air turbine rotor 23 through a spur reduction gear generally indicated at 24. The gear train between turbine rotor 23 and the compressor/turbine shaft 13 may give a speed reduction of the order of say 10:1. This reduction gear would be appropriate for starting an engine which becomes self-driving at 1800 to 2000 revolutions per minute, the air turbine being designed to run up to a maximum speed of the order of 20,000 r.p.m.

For the purposes of starting the engine the air turbine is connected to an external source of compressed air indicated diagrammatically by air bottle 25, selector valve 26 being rotated to the position where the valve channel 27 connects with the air supply line 28 from the bottle 25 and with the air inlet line 29 to the air turbine entry volute 30. It will be appreciated that a starting cartridge might be substituted for the air bottle 25.

The arrangement so far described is appropriate for starting of the gas-turbine engine, the free-wheel device being arranged to permit the compressor/turbine shaft of the engine to overrun the air turbine when the gas-turbine engine becomes self-driving.

The air turbine additionally drives an alternator 45 through drive shaft 31 connected to a turbine output shaft 32 through a hydraulic coupling device generally indicated at 33.

The hydraulic clutch shown in Figure 1 is of the type in which during operation a continuous flow of liquid, e.g. oil derived from the engine lubrication system, enters through pipe line 34 to vaned impeller chamber 35 constituted between the two parts 36 and 37 of the clutch. Leakage flow from the chamber is permitted through a restricted orifice 38 communicating with pipeline 39 by which the fluid is returned to the system. A valve 40 controls the introduction of liquid to the clutch. Thus when the valve 40 is closed the clutch will empty through the restricted orifice 38 rendering the drive between the air turbine and the alternator ineffective. When valve 40 is open as indicated the impeller chamber is filled with liquid and the drive is then effective between the air turbine and the alternator. After starting the engine the valve 26 is rotated to the position indicated in the figure, whereby pipeline 29 is connected to pipeline 41 which connects with a suitable pressure location in the compressor system 10 of the engine. During normal running of the engine the valves 26 and 40 are in the positions indicated, the alternator 45 being driven by the air turbine. It will be noted that the shaft 21 continues to drive shaft 17 through bevel gears 18 and 22.

Conveniently the exhaust flow from the air turbine is ducted through pipeline 42 to enter the casing of the alternator 45 to cool it. The exhaust passage 43 from the alternator casing may lead to a venturi device 43a providing an ejector system, the flow through the venturi being induced by the flight speed of the aircraft.

The speed of the alternator is governed in manner now to be described.

In order to obtain a desired frequency of supply from the alternator this may be controlled to rotate at say 18,000 r.p.m., the air supply to the air turbine being controlled by means of a speed governor device.

The speed governor consists of a rotor 44a driven by the shaft of the alternator 45 and provided with a casing 44. Pipe 50 is connected to the low-pressure fuel system of the engine and fuel is supplied via pipe 49a to the interior of the rotor 44a. Rotation of the rotor 44a produces a pressure rise in the fuel in chamber 44 proportional to the square of the speed of rotation of the rotor. This pressure rise is utilised to control the bleed valve of a servo valve device 46.

The device 46 contains a chamber 47 divided by a diaphragm 48 into two parts 47a, 47b, and the centrifugal pressure in the chamber 44 is applied to chamber 47a by means of pipe 49b, the pressure of the low pressure fuel being applied to chamber 47b by means of a pipe 49c from pipeline 50. The diaphragm is thus acted on by a downward force which is transmitted through rod 51 to one end of a lever 52 pivoted in a chamber 53, the other end of the lever carrying a half-ball valve 54 controlling the bleed of fuel from pipe 55; a compression spring 56 loads the lever 52 in opposition to the diaphragm load.

The air supplied to the air turbine is regulated by valve 58, the spindle of which carries a pinion 58a, and the valve is controlled by a servo device 59. The device 59 comprises a cylinder 60 in which works a piston 61, the piston rod of which carries a rack 61a meshing with the pinion 58a. The two ends of the cylinder 60 are in communication via a restrictor 62, and high-pressure fuel is supplied through pipe 63 to one end of the cylinder, while the other end is connected to pipe 55. A compression spring 64 loads the piston 61 in the direction to open the valve 58. In operation, the half-ball valve 54 is partly open in its equilibrium position, permitting high-pressure fuel to flow through the restrictor 62, and there is thus a pressure drop across this restrictor and a lower pressure is applied to the underside of the piston than to the upper side which is acted on by the high-pressure fuel. The piston rod of piston 61 is formed at its end remote from the servo device 59 with a second piston 101 which works in a cylinder 100, compressor delivery pressure being applied to the upper side of this piston by means of pipe 41a to lead the piston in the direction to close the valve 58. Under steady conditions the resultant downward load on the piston 61 is balanced by the load applied by the spring 64. If the governed speed of the alternator is exceeded a greater pressure rise is caused by rotation of the rotor 44a and this results in an increased downward load on the diaphragm 48, which opens bleed valve 54 and thus allows a greater flow of high-pressure fuel through restrictor 62, the pressure drop across this restrictor increasing, and decreasing the pressure underneath piston 61 which moves downward tending to close air valve 58 restricting the flow of air to the turbine. If the speed of the alternator tends to fall then the reverse process occurs.

If compressor pressure supplied through pipe 41 increases then a greater load is applied to piston 101 which rotates valve 58 in the direction tending to close it, thus reducing the pressure of the air entering the air turbine entry volute 30, and if compressor pressure falls the valve 58 is rotated in the direction to open the valve, so that under constant load conditions the effect on the air turbine 23 of variations in compressor delivery pressure is minimised.

The selector valve 26 and valve 40 are solenoid actuated, the solenoids 65 and 66 being in series with a battery 67, a starter switch 68 co-operating with contacts 68a and a pair of contacts 69. The contacts 69 are normally closed. To start the engine the starter switch is operated completing the circuit through solenoids 65 and 66 which draw in their armatures 65a and 66a. The starter switch is self-holding, as completion of the circuit energises solenoid 70, and, after operation, the starter button may be released. The starting process now occurs, and when the gas turbine reaches self-sustaining speed the centrifugal governor 71 opens the contacts 69. This speed would be somewhat greater than that at which the freewheel device in the starter drive goes into operation. The centrifugal governor 71 is loaded by a compression spring 72, the initial loading of which is overcome at self-sustaining speed of the engine. The three solenoids are de-energised and their respective springs open the starter switch, and also operate the valves 27 and 40 to allow the alternator to be driven.

It will be appreciated that where the alternator is connected with other alternators in the installation the speed governing may be effected by utilising a master control on one of the alternators. Further, the air supply driving the air turbine in normal running of the engine may be derived from other engines in the installation.

In Figure 2 the fluid coupling between the alternator and air turbine is omitted so that during starting the alternator is driven; however, no current is produced, and no electrical load is imposed on the alternator as its field circuit is broken. The field winding is completed through leads 73 and contacts 74, the contacts 74 being controlled by a further solenoid 75 connected in series with those in Figure 1. Thus for starting the contacts are open, but are closed by the spring 76 at the same time as the valves 27 and 40 are operated.

In Figure 3 a combustion chamber 77 consisting of an air casing 78 and flame tube 79 is provided in the line from the air bottle. A fuel injector 80 is supplied with fuel from the engine high-pressure fuel system, and a shut-off valve 81 is provided in the fuel line and operated by solenoid 65 controlling valve 27. Thus fuel is cut off at the same moment as the air supply starts to be taken from the engine compressor and the starting operation ceases. When fuel is being burned in the air supplied to the air turbine it is preferable not to pass the exhaust flow from the turbine through the alternator as in Figure 1, therefore a further valve 82 controlled by solenoid 83 is provided for this embodiment. The solenoid 83 is in series with the other solenoids and when energised operates valve 82 to direct the exhaust flow from the air turbine direct to atmosphere.

In Figure 4 the speed of the alternator is controlled by permitting "slip" in the hydraulic coupling, and the only difference from Figure 1 is that instead of providing an air regulator valve 58 the servo device 59 operates a throttle valve 84 in the oil supply line to the hydraulic coupling. In the diagram the throttling effect is provided by a needle valve 84a having a rack 84b engaged by a pinion 84c under the control of the servo device 59. The needle 84a co-operates with a restriction or seating 84d within the valve body. At governed speed a certain amount of "slip" in the coupling is allowed, so that, if the speed of the alternator falls, the throttle valve 84 is opened so that the amount of oil in the coupling is increased and the "slip" is decreased.

In Figure 5 an isolating clutch 85 is provided between the air turbine 30 and the reduction gear 24 in the drive to the engine. The clutch is in the form of another hydraulic coupling similar to coupling 33 (Fig. 1). Valve 40 is replaced by a change-over valve 86 operated by the solenoid 66. During starting, oil is allowed to flow into coupling 85, coupling 33 being empty, and when the solenoid 66 is operated at the end of the starting operation, the changeover valve 86 shuts off the flow of oil to the coupling 85, which empties, interrupting the drive to the engine, and allows the oil to flow into the coupling 33.

Figures 2 to 5 inclusive are of course all modifications of Figure 1.

Figure 6 shows an alternative arrangement of governing the speed of the alternator 45 in which the frequency of the electrical output from the alternator is sensed. The alternator 45 is of the three-phase type having three output leads 102. Across one phase of the alternator is connected by leads 105 and 106 a series resonant circuit comprising an inductor 103 and capacitor 104 which are chosen to be in resonance at the required governed frequency. Below this required frequency the voltage across the capacitor will be greater than that across the inductor and vice versa. The two voltages are then fed into a servo control amplifier 107, the D.C. output of which defines the speed and direction of a servo motor 108 such that the speed and direction depends on the difference of voltages across the capacitor 104 and inductor 103. This servo motor 108 controls movement of valve 58 by means of a pinion 109 meshing with a rack 110, the other end of which meshes with the pinion 58a on the spindle of the valve 58. Lead 111 between the servo control amplifier 107 and the servo motor 108 has provided in it a variable resistor 112, the moving contact 112a of which is controlled by a piston 101 working in cylinder 100 to which is applied compressor pressure from pipe 41, a spring 113 being provided beneath the piston 101 to act in opposition to the air pressure. The action of the variable resistor 112 and piston and cylinder device 100, 101 is comparable with that of the piston and cylinder device 100, 101 in Figure 1.

I claim:

1. A power plant installation comprising an engine, a gas turbine, a driving connection between said gas turbine and said engine effective for starting the engine, means for automatically interrupting said driving connection after said engine has started, an electric generator, a separate driving connection between said gas turbine and said generator, an external source of gas, a connection therefrom to said gas turbine to drive the same, a source of gas produced by said engine, a connection therefrom to said gas turbine also to drive the same, means responsive solely to engine speed for changing over from said first source of gas to said second source of gas when said engine has started, and means to interrupt said driving connection between said gas turbine and said generator when said external source of gas is connected to the turbine.

2. A power plant installation comprising an engine, a gas turbine, a driving connection between said gas turbine and said engine effective for starting the engine, means for automatically interrupting said driving connection when said engine has started, an electric generator, a separate driving connection between said gas turbine and said generator, a hydraulic coupling in said last mentioned connection, an external source of gas, a connection therefrom to said gas turbine to drive the same, a source of gas produced by said engine, a connection therefrom to said gas turbine also to drive the same, means responsive to engine speed for changing over from said first source of gas to said second source of gas when said engine has started, means responsive to engine starting speed for rendering the drive through the hydraulic coupling ineffective while the engine is being started and means to restore effectiveness of the coupling responsive to engine speed above starting speed.

3. A power plant installation comprising an engine, a gas turbine, a driving connection between said gas turbine and said engine effective for starting the engine, means for automatically interrupting said driving connection after said engine has started, an electric generator, a separate driving connection between said gas turbine and said generator, a hydraulic coupling in said last mentioned connection, an external source of gas, a connection therefrom to said gas turbine to drive the same, a source of gas produced by said engine, a connection therefrom to said gas turbine also to drive the same, and means for changing over completely from said first source of gas to said second source of gas responsive to said engine starting, an outlet from said hydraulic coupling, a restrictor in said outlet permitting a restricted flow therefrom, means supplying liquid to said coupling under running conditions of the engine, and means for interrupting said supply of liquid until the engine has started and attained a preselected speed of rotation.

4. A power plant installation comprising an engine, an expansion turbine, a driving connection between said turbine and said engine effective for starting the engine, means for automatically interrupting said driving connection after said engine has started, an electric generator, a separate driving connection between said turbine and said generator, an external source of gas, a connection therefrom to said gas turbine to drive the same, a source of gas produced by said engine, a connection therefrom to said turbine also to drive the same, means for changing over from first source of gas to second source of gas when the engine has started, means for conducting exhaust gas expanded and cooled in said turbine to said generator to flow therethrough, and means to render said separate driving connection ineffective when the external source of gas is connected to said turbine.

5. A power plant installation comprising an engine, a gas turbine, a driving connection between said gas turbine and said engine effective for starting the engine, means for automatically interrupting said driving connection after said engine has started, an electric generator, a separate driving connection between said gas turbine and said generator, an external source of gas, a connection therefrom to said gas turbine to drive the same, a source of gas produced by said engine, a connection therefrom to said gas turbine also to drive the same, means for changing over from said first source of gas to said second source of gas when the engine has started, a rotor driven synchronously with the generator, a casing enclosing said rotor, a source of fluid, a connection from said fluid source to said casing, a chamber, a diaphragm dividing said chamber into two compartments, a lever, a member connecting said diaphragm to one end of said lever, an orifice, a valve member carried by the other end of said lever and co-operating with said orifice, a connection from said rotor casing to one of said compartments to load said diaphragm in the sense to open said valve, a connection from said fluid source to the other of said compartments, a spring tending to close said valve, a cylinder, a piston reciprocable in said cylinder, a connection between the two ends of said cylinder, a restrictor in said connection, a source of liquid under pressure, a connection from said source to one end of said cylinder, a connection from the other end of said cylinder to said orifice, a regulating valve in the connection between said source of gas produced by said engine and said turbine, a connection between said piston and said valve such that the resultant force on said piston caused by the pressure drop across said restrictor tends to close said regulating valve, a spring tending to open said regulating valve whereby upon the speed of the generator increasing said lever moves said valve member away from its associated orifice causing movement of said piston to close said regulator valve to reduce flow of gas to said gas turbine.

6. A power plant installation comprising an engine, a gas turbine, a driving connection between said gas turbine and said engine effective for starting the engine, means for automatically interrupting said driving connection after said engine has started, an electric generator, a separate driving connection between said gas turbine and said generator, an external source of gas, a connection therefrom to said gas turbine to drive the same, a source of gas produced by said engine, a connection therefrom to said gas turbine also to drive the same, means for changing over from said first source of gas to said second source of gas when the engine has started, a valve between said second source of gas and said turbine, a governor driven synchronously with the generator, and a connection between such governor and said valve in the second gas connection to said turbine which operates to reduce such supply if a predetermined speed is exceeded, and means to interrupt said driving connection between said gas turbine and said generator when said external source of gas is connected to said turbine.

7. A power plant installation as claimed in claim 1 in which a starter switch completes an electric circuit including a solenoid which operates a valve to connect said first source of gas to said gas turbine, means in said circuit operated by the engine which when it has attained a preselected speed of rotation breaks said circuit, and means then causing return of said valve to connect said second source of gas to said gas turbine.

8. A power plant installation as claimed in claim 7 in which said starter switch made circuit also operates to break the field winding circuit of said generator.

9. A power plant installation as claimed in claim 5 wherein said engine is a gas turbine engine and said source of gas produced by said engine is air compressed by the compressor of said engine, and further comprising means responsive to the pressure of the air compressed by the compressor of said engine to act upon said air regulating valve in the sense of closing said valve.

10. A power plant installation as claimed in claim 9 and wherein the means responsive to the pressure of the air compressed by the compressor of said engine comprises a cylinder, a piston reciprocable in said cylinder and carried by the piston rod of said first piston, and a connection to the compressor of said engine to supply air compressed by the compressor to said last mentioned cylinder.

11. A power plant installation as claimed claim 1 and wherein the electric generator is an alternator and further comprising a governor system controlling the speed of rotation of said alternator and comprising a series resonant circuit connected across one phase of the alternator, said series resonant circuit comprising an inductor and a capacitor, a servo control amplifier to which is fed the respective voltages across the inductor and capacitor, a servo motor, connections between the output of said servo control amplifier and said servo motor, an air regulator valve in the connection from the source of gas produced by said engine to the turbine, movement of said valve being controlled by said servo motor.

12. A power plant installation as claimed in claim 11 and further comprising a variable resistor in the connection between said servo control amplifier and said servo motor, means responsive to the pressure of the gas from said source of gas produced by said engine to control the variable resistor in the sense of increasing the resistance with increase of pressure of said gas.

13. A power plant installation as claimed in claim 7 having a fluid coupling between the gas turbine and generator, a source of fluid supply for said coupling, a solenoid actuated valve arranged to cut off said source of supply and means connecting said valve solenoid in said circuit.

14. A power plant installation comprising an engine, an expansion turbine, a driving connection between said turbine and said engine effective for starting the engine, means for automatically interrupting said driving connection after said engine has started, an electric generator, a separate driving connection between said expansion turbine and said generator, a hydraulic coupling in said last mentioned connection, an external source of gas, a connection therefrom to said expansion turbine to drive the same, a source of gas produced by said engine, a connection therefrom to said turbine also to drive the same, means for changing over from said first source of gas to second source of gas when the engine has started, means for conducting exhaust gas expanded and cooled in said turbine to said generator to flow therethrough, and means to open said separate driving connection when said external source of gas is connected to said turbine.

15. A power plant installation comprising an engine, an expansion turbine, a driving connection between said turbine and said engine effective for starting the engine, means for automatically interrupting said driving connection when said engine has started, an electric generator, a separate driving connection between said expansion turbine and said generator, a hydraulic coupling in said last mentioned connection, an external source of gas, a connection therefrom to said turbine to drive the same, a source of gas produced by said engine, a connection therefrom to said turbine also to drive the same, means for changing over from first source of gas to second source of gas when the engine has started, means for rendering the drive through the hydraulic coupling ineffective while the engine is being started and means for conducting exhaust gas expanded and cooled in said turbine to said generator to flow therethrough.

16. A power plant installation comprising an engine, an expansion turbine, a driving connection between said turbine and said engine effective for starting the engine, means for automatically interrupting said driving connection after said engine has started, an electric generator, a separate driving connection between said turbine and said generator, an external source of gas, a connection therefrom to said turbine to drive the same, a source of gas produced by said engine, a connection therefrom to said turbine also to drive the same, means for changing over from first source of gas to second source of gas when the engine has started, means for conducting exhaust gas expanded and cooled in said turbine to said generator to flow therethrough, a rotor driven synchronously with the generator, a casing enclosing said rotor, a source of fluid, a connection from said fluid source to said casing, a chamber, a diaphragm dividing said chamber into two compartments, a lever, a member connecting said diaphragm to one end of said lever, an orifice, a valve member carried by the other end of said lever and co-operating with said orifice, a connection from said rotor casing to one of said compartments to load said diaphragm in the sense to open said valve, a connection from said fluid source to the other of said compartments, a spring tending to close said valve, a cylinder, a piston reciprocable in said cylinder, a connection between the two ends of said cylinder, a restrictor in said connection, a source of liquid under pressure, a connection from said source to one end of said cylinder, a connection from the other end of said cylinder to said orifice, an air regulating valve in the connection between said source of gas produced by said engine and said turbine, a connection between said piston and said valve such that the resultant force on said piston caused by the pressure drop across said restrictor tends to close said regulating valve, a spring tending to open said regulating valve whereby upon the speed of the generator increasing said lever moves said valve member away from its associated orifice causing movement of said piston to close said air regulator valve to reduce flow of gas to said expansion turbine.

17. A power plant installation comprising an internal combustion turbine engine, an expansion turbine, a driving connection between said expansion turbine and said engine, effective for starting the same, means for automatically interrupting said driving connection when said engine has started, an electric generator, a separate driving connection between said expansion turbine and said generator, an external source of gas, a connection therefrom to said expansion turbine, another connection to said expansion turbine from the internal combustion turbine engine compressor and valve means for changing over from first source of gas to the compressor air to drive said expansion turbine when engine has started, a piston loaded by compressor delivery pressure between the compressor and the expansion turbine, a valve in the connection between said compressor and turbine solely responsive to movement of said piston, said last mentioned valve compressing a member urged towards a seating against resilient means by the compressor pressure thus acting to even out graduations of pressure in said connection, means for conducting exhaust gas expanded and cooled in said turbine to said generator to flow therethrough, and means to interrupt said driving connection between said gas turbine and said generator when said external source of gas is connected to said turbine.

References Cited in the file of this patent

UNITED STATES PATENTS

| | | |
|---|---|---|
| Re. 23,444 | Nettel | Dec. 18, 1951 |
| 2,127,738 | Kugel | Aug. 23, 1938 |
| 2,372,453 | Sherman et al. | Mar. 27, 1945 |
| 2,511,854 | Kane | June 20, 1950 |
| 2,585,029 | Nettel | June 12, 1952 |
| 2,608,054 | Price | Aug. 26, 1952 |
| 2,633,830 | McCourty et al. | Apr. 7, 1953 |
| 2,659,194 | Huber | Nov. 17, 1953 |
| 2,692,476 | Schaal et al. | Oct. 26, 1954 |
| 2,739,442 | Neal et al. | Mar. 27, 1956 |
| 2,806,351 | Kent et al. | Sept. 17, 1957 |